United States Patent [19]
Carlsen

[11] Patent Number: 5,953,409
[45] Date of Patent: Sep. 14, 1999

[54] TELEPHONE LINE INTERFACE

[75] Inventor: Sten Carlsen, Rødovre, Denmark

[73] Assignee: Nokia Mobile Phones Limited, Espoo, Finland

[21] Appl. No.: 08/988,075

[22] Filed: Dec. 10, 1997

[30] Foreign Application Priority Data

Dec. 11, 1996 [GB] United Kingdom .................. 9625776

[51] Int. Cl.⁶ .................................................. H04M 1/00
[52] U.S. Cl. ........................................ 379/394; 379/399
[58] Field of Search .................................. 379/399, 344, 379/398, 404, 394, 340

[56] References Cited

U.S. PATENT DOCUMENTS

| | | | |
|---|---|---|---|
| 3,571,521 | 3/1971 | Kleissi | 379/394 |
| 3,828,281 | 8/1974 | Chambers, Jr. | 333/17 |
| 3,989,906 | 11/1976 | Kiko | 379/346 |
| 3,989,907 | 11/1976 | Chambers, Jr. | 379/340 |
| 4,032,726 | 6/1977 | Chambers, Jr. | 379/400 |
| 4,037,066 | 7/1977 | Kiko | 379/400 |
| 4,359,609 | 11/1982 | Apfel | 179/16 F |
| 4,456,991 | 6/1984 | Chea, Jr. et al. | 370/359 |
| 5,333,192 | 7/1994 | McGinn | 379/399 |
| 5,459,440 | 10/1995 | Claridge et al. | 333/17.3 |
| 5,559,440 | 9/1996 | Lopresti et al. | 324/607 |
| 5,598,467 | 1/1997 | Bremner et al. | 379/398 |
| 5,608,795 | 3/1997 | Gay | 379/399 |
| 5,811,984 | 9/1998 | Long et al. | 326/30 |

*Primary Examiner*—Reinhard J. Eisenzopf
*Assistant Examiner*—Charles N. Appiah
*Attorney, Agent, or Firm*—Perman & Green, LLP

[57] ABSTRACT

An interface unit for providing impedance matching with the impedance $Z_{line}$ between two transmission line terminals and a transmitter/receiver unit connected thereto comprises a current generator for generating an AC current running into the transmission line, a device for sensing the voltage across the two terminals of the transmission line, and a control device receiving a value of the sensed voltage and controlling the current generator in response thereto, so that said current generator supplies an AC current which, together with the voltage across the two terminals of the transmission line, ensures that, seen from the transmission line, the unit has an output impedance corresponding to the transmission line impedance $Z_{line}$.

12 Claims, 1 Drawing Sheet

TELEPHONE LINE INTERFACE

BACKGROUND OF THE INVENTION

The invention concerns a method of providing impedance matching between a line impedance $Z_{line}$ with two transmission terminals, and a transmitter/receiver unit connected thereto as well as an interface unit for providing such an impedance matching.

Historically, public service telephone networks (PSTN) have developed as isolated networks with individual specifications—including network impedance. These networks are now used widely, and it is not readily possible to change the specifications of a network without affecting the operation for the users of the network. This means in practice that a new type of telephone apparatus to be marketed e.g. all over Europe must be designed in a large number of versions with different network interfaces corresponding to the number of different network impedances. This involves problems of logistics for the manufacturers of signalling devices, since devices for one market cannot readily for used on another market.

SUMMARY OF THE INVENTION

In accordance with a first aspect of the invention there is provided a method of providing impedance matching with the impedance $Z_{line}$ between two transmission line terminals and a transmitter/receiver unit connected thereto, wherein the transmitter/receiver has a current generator for generating an AC current which is fed to one of the two transmission line terminals, and comprising sensing the voltage across the two terminals of the transmission line and controlling the current generator in response to the sensed voltage, so that the AC current, together with the voltage across the two terminals of the transmission line, ensures that, seen from the transmission line, the unit has an output impedance corresponding to the impedance $Z_{line}$ of the transmission line.

The invention provides a method enabling matching of the impedance of a transmitter/receiver, such as a telephone, a telefax or a modem, to the impedance of a transmission line, without a special hardware solution being needed.

This means that the output impedance of the transmitter/receiver may be adjusted by means of the current generator controlled in response to a voltage measurement. Hereby, the transmitter/receiver itself can adjust its output impedance in response to a voltage measurement performed by itself. As the interface unit adapts its output impedance to the impedance of the transmission line, a telephone for a PSTN network may be used globally in spite of the different impedances of the individual networks, without having to be designed with an impedance-specific interface. Further, the interface unit ensures optimum impedance matching even if the PSTN network impedance should vary. The interface unit hereby ensures an improved quality in the communications channel.

In accordance with a second aspect of the present invention there is provided an interface unit for providing impedance matching with the impedance $Z_{line}$ between two transmission line terminals and a transmitter/receiver unit connected thereto, and comprising: a current generator for generating an AC current running into the transmission line; a device for sensing the voltage across the two terminals of the transmission line; and a control device receiving a value of the sensed voltage and controlling the current generator in response thereto, so that said current generator supplies an AC current which, together with the voltage across the two terminals of the transmission line, provides that, seen from the transmission line, the unit has an output impedance compatible with the transmission line impedance $Z_{line}$.

The invention moreover concerns an interface for providing impedance matching with the impedance $Z_{line}$ between two transmission line terminals and a transmitter/receiver unit connected thereto. The interface unit comprises an impedance Z connected to the transmission line, a current generator for generating an AC current running through the impedance and into the transmission line, a device for sensing the voltage across the two terminals of the transmission line, and a control device receiving a value of the sensed voltage and controlling the current generator in response thereto so that said current generator supplies an AC current which, together with the voltage across the two terminals of the transmission line, ensures that, seen from the transmission line, the unit has an output impedance corresponding to the transmission line impedance $Z_{line}$.

The interface unit impedance connected to the transmission line is a resistance which is connected in series with one of the terminals of the transmission line. This impedance, together with the transmission line impedance, forms a voltage divider in which the voltage sensed is the voltage in the centre of the voltage divider. The control device then determines the size of the AC current in response to the sensed voltage across the impedance Z. The transmission line impedance rating is set by an operator.

In a preferred embodiment, the voltage-sensing device for sensing the voltage across the two terminals of the transmission line is coupled to the same terminal as the impedance Z, and the analog voltage level is converted via an analog-to-digital converter into a digital representation which is fed to a digital amplifier controlling the gain of a digital speech and/or data signal to be transmitted along the transmission line. The digital output signal from the digital amplifier is fed to a digital-to-analog converter which converts the digital speech and/or data signal into an analog signal, which is the sum of the speech and/or data signal and a compensation or response current, the latter contribution ensuring correct impedance matching.

The interface unit, which will be described with reference to the accompanying drawing, is intended for use in connection with telephones, telefaxes or modems adapted to be connected to a public telephone network, such as the PSTN network. Of course, it will be evident to use it in other applications where a signalling device is to have its impedance adapted to a network having a given network impedance.

BRIEF DESCRIPTION OF THE DRAWINGS

The invention will be explained more fully below in connection with a preferred embodiment and with reference to the drawing, in which FIG. 1 schematically shows a preferred embodiment of an interface according to the invention.

DETAILED DESCRIPTION OF THE INVENTION

Figure 1:
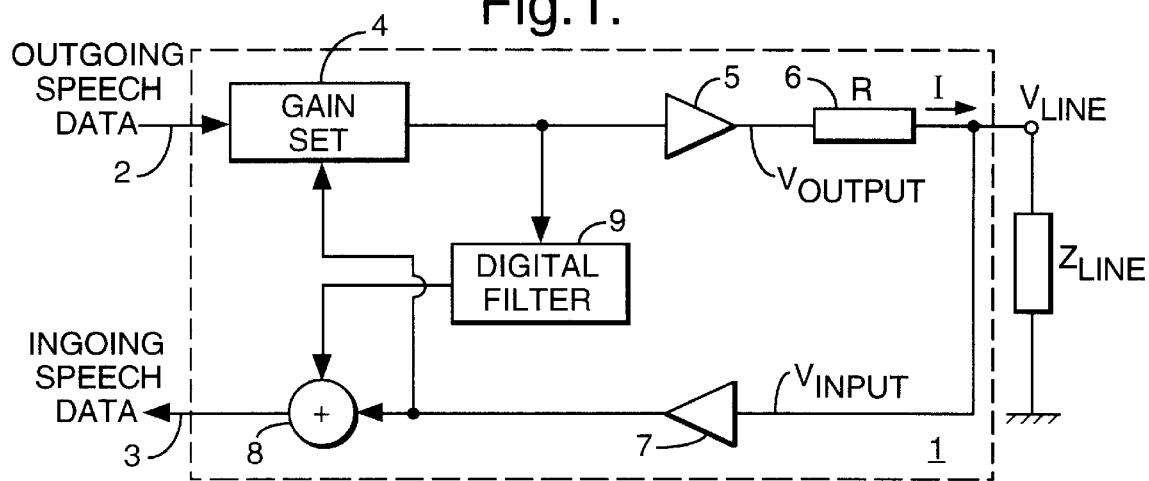

FIG. 1 shows a preferred embodiment of an interface unit according to the invention, said interface unit, in the preferred embodiment, being integrated in the output gate of a telephone for connection to a PSTN network. The interface unit is generally designated by 1 and is provided with two connecting lines 2 and 3, through which it receives a digital signal from the rest of the telephone and supplies a digital signal to the rest of the telephone. A digital signal, e.g. a speech signal, in the form of parallel data bits is received via the connecting line 2 on the input of a digital gain set unit 4 (digital amplifier). Here, the digital signal is amplified in response to a control signal.

The amplified, digital signal is fed from the gain set unit 4 to a digital-to-analog converter 5 (DAC), which converts the digital signal into an analog voltage, $V_{output}$, which is applied to one of the terminals of a resistor 6. The resistor 6 has the resistance R. The other terminal on the resistor 6 is connected to one of the terminals of the transmission line. The actual transmission line may be a PSTN line, and its represented by an impedance $Z_{line}$ which corresponds to the transmission line impedance. This impedance varies from country to country, examples from Europe being:

| Country | Impedance |
|---|---|
| Austria | 600Ω |
| Belgium | 600Ω |
| Denmark | 400Ω + 500Ω ∥ 330 nF |
| Germany | 220Ω + 820Ω ∥ 220 nF |
| Switzerland | 220Ω + 820Ω ∥ 115 nF |
| United Kingdom | 370Ω+ 620Ω ∥ 310 nF |

Thus, a current, I, will run from the output of the DAC 5 through the resistor 6 and the line impedance $Z_{line}$. The resistor 6 and the line impedance $Z_{line}$ serve as a voltage divider, and the voltage in the centre of the voltage divider is detected by a voltage detector—here in the form of an analog-to-digital converter 7 (ADC), which receives the analog voltage $V_{input}$ in the node and forms a digital representation in response thereto. By nature, the ADC 7 serves as an infinitely high impedance, and therefore no current will run in the connection to the input thereof.

The current, I, running through the resistor 6 and further into the transmission line, may be expressed as:

$$I=(V_{output}-V_{input})/R \qquad (1)$$

where digital representations of both $V_{output}$ and $V_{input}$ are known internally in the unit, which is born with the impedance, R.

The digitized signal is fed from the ADC 7 to an input on the gain set unit 4, in which it is used for determining the size of the current running through the resistor 6, and to an adder 8.

The digital output signal from the gain set unit 4 is branched before being fed to the DAC 5, as it is passed to a digital filter 9 which removes the outgoing signal (speech/data+compensation) from the ingoing signal (speech/data). The 4-line to 2-line hybrid function is performed by using the filter 9 for subtracting the calculated voltage of the PSTN line connection from the actual voltage of the PSTN line. The signal present on the output of the adder 8 will thus be the received signal alone.

Figure 2:
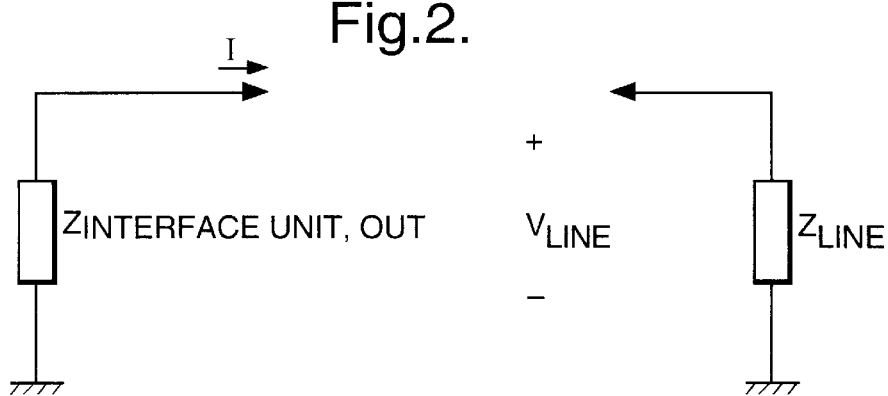
FIG. 2 schematically shows how the output impedance of the interface unit is calculated.

FIG. 2 shows how the output impedance of the interface unit 4 may be determined by means of Ohm's law by a simple current/voltage consideration.

The transmission line will see the interface unit output impedance, $Z_{interface\ unit,\ output}$ given by the expression (2):

$$Z_{interface\ unit,\ output}=V_{line}/I \qquad (2)$$

and since the current, I, was determined in expression (1), and since $V_{line}$ is equal to $V_{input}$, the expression (2) may be reduced to:

$$Z_{interface\ unit,\ output}=R\ V_{input}/(V_{output}-V_{input}). \qquad (3)$$

It will be seen from this that adjustment of the output voltage $V_{output}$ will make a purely resistive resistance R match a complex network impedance, as the voltages $V_{output}$ and $V_{input}$, when out of phase, cause the current through the resistance to be out of phase with the voltage across the resistance. Hence:

$$V_{output}=V_{input}(Z_{interface\ unit,\ output}+R)/Z_{interface\ unit,\ output}$$

or $$V_{output}=V_{input}(Z_{line}+R)/Z_{line} \qquad (4)$$

The digital gain set unit 4 is a digital voltage amplifier which is integrated in a digital ASIC together with the digital-to-analog converter 5 (DAC), analog-to-digital converter 7 (ADC), adder 8 and digital high-pass filter 9 in the preferred embodiment. In combination, these units perform a digital signal processing corresponding to a digital filtering.

The transmission line impedance is determined, and the interface unit generates current which is sent into the transmission line, and which, together with the voltage between the transmission line terminals, ensures that the interface unit has an output impedance corresponding to the transmission line impedance. It will readily be appreciated that this is feasible when the transmission line impedance is resistive. It may be more difficult to understand when the transmission line impedance contains inductive or capacitive elements, but, actually, it is just a matter of bringing voltage and current into an amplitude ratio and a mutual phase corresponding to the desired impedance.

This is feasible in practice e.g. by connecting one terminal of a resistor to one terminal of the transmission line and applying a voltage signal to the other terminal, ensuring that the current through the resistor is out of phase with the voltage on the output terminal of the resistor. This is achieved in the preferred embodiment by generating a digital control signal which is converted into an analog signal, $V_{output}$, by means of the DAC 5.

Figure 3:
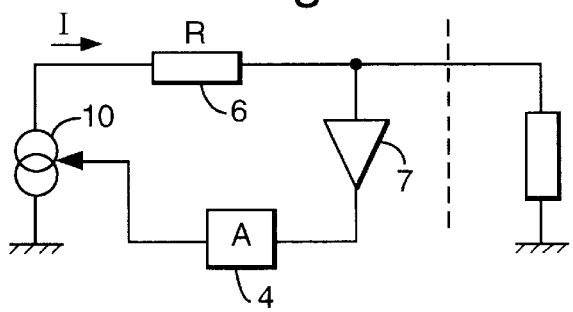
FIG. 3 schematically shows how the current generator of the interface unit is controlled.

FIG. 3 shows how the current, I, is controlled, the voltage in the centre of the voltage divider being detected via the ADC 7, which feeds a voltage representation to the gain set unit 4 which, via a look-up table, generates a digital output representation to the DAC 5 serving as an ideal current generator, which is indicated by the reference numeral 10.

Figure 4:
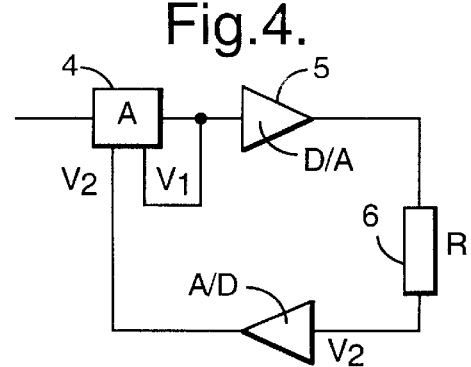
FIG. 4 schematically shows how the current to the transmission line is determined.

FIG. 4 shows how the current, I, through the resistor 6 is measured, the analog voltage $V_1$ and $V_2$ on each side of the resistor 6 being detected and fed to the gain set unit 4 via two connections having an infinitely high impedance in the form of a DAC 7. The value $V_1$ is known internally in the gain set unit 4. The gain set unit 4 can hereby calculate the current, I, through the resistor 6 on the basis of the expression:

$$I=(V_1-V_2)/R \qquad (5)$$

where the resistance R is known or may be determined in a manner known per se.

The gain set unit 4 will hereby be cable to control the current, I, as the current measurement forms part of a feedback loop. Since the matching thus takes place adaptively, it is possible to use an inexpensive and simple DAC 5.

Although it has not been mentioned in the foregoing, various known echo cancelling techniques may be used for adapting the line termination to the actual line impedance by measuring the residual signal on the output of the ADC 7.

The functioning of the preferred embodiment is based on sampling of the voltages $V_{output}$ and $V_{input}$. The sampling frequency is to be selected so as to be in accordance with Nyquist for the speech or data signals which occur in the transmission line and the lines 2, 3.

The components 8 and 9 provide a function which may be considered as echo cancelling. Therefore, the filter 9 may advantageously be made adaptive so that the ingoing speech/data signal may essentially be cleaned of residues of the outgoing speech/data signal—irrespective of the actual transmission line impedance.

The invention may be applied in signalling devices both at the subscriber side and at the exchange side. In addition, the invention may advantageously be applied in connection with a fixed part for a DECT telephone system.

What is claimed is:

1. A method of providing impedance matching between the impedance $Z_{line}$ of a transmission line and a transmitter/receiver unit connected thereto, the impedance of the transmission line being measured between first and second terminals of the transmission line, the method comprising steps of:

employing a current generator for generating an AC current carrying a signal of the transmitter/receiver unit;

connecting an impedance element between the current generator and the first terminal of the transmission line;

feeding the AC current via the impedance element to the first transmission line terminal;

sensing the voltage across the two terminals of the transmission line; and controlling the current generator in response to the sensed voltage so that the AC current, together with the voltage across the two terminals of the transmission line, provides that, as seen from the transmission line, the transmitter/receiver unit has an output impedance corresponding to the transmission line impedance $Z_{line}$.

2. An interface unit for providing impedance matching with the impedance $Z_{line}$ between two transmission line terminals and a transmitter/receiver unit connected thereto, the transmitter/receiver unit transmitting a signal via the interface unit to the transmission line and receiving a signal via the interface unit from the transmission line, the interface unit comprising:

a current generator for generating a current to be applied to the transmission line;

an impedance element connecting between an output terminal of the current generator and a terminal of the transmission line for applying current of the current generator to the transmission line;

a device for sensing the voltage across the two terminals of the transmission line; and a control device receiving a value of the sensed voltage and controlling the current generator in response thereto, so that the current of said current generator which is applied to the transmission line, together with the voltage across the two terminals of the transmission line, provide that, as seen from the transmission line, the interface unit has an output impedance compatible with the transmission line impedance $Z_{line}$.

3. An interface unit according to claim 2, wherein the impedance element connected to the transmission line is a resistance which is connected to one of the transmission line terminals.

4. An interface unit according to claim 2, wherein a further voltage-sensing device senses the voltage across the impedance element, and wherein the control device determines the size of the AC current in response to the sensed voltage across the impedance.

5. A telephone, a telefax or a modem having an interface unit according to claim 2.

6. An interface unit according to claim 2, further comprising:

a filter connecting with the current generator and being operative with a portion of the current for extracting a transmitted signal from the current to produce a filtered signal; and an adder for subtracting the filtered signal from a received signal to remove influence of the transmitted signal from the received signal.

7. An interface unit for providing impedance matching with the impedance $Z_{line}$ between two transmission line terminals and a transmitter/receiver unit connected thereto, and comprising:

a current generator for generating an AC current running into the transmission line;

a device for sensing the voltage across the two terminals of the transmission line;

a control device receiving a value of the sensed voltage and controlling the current generator in response thereto, so that the current provided by the current generator, together with the voltage across the two terminals of the transmission line, provide that, as seen from the transmission line, the interface unit has an output impedance compatible with the transmission line impedance $Z_{line}$; and wherein the current generator comprises a digital gain set unit for generating a digital signal in response to the sensed voltage, a digital-to-analog converter for converting the digital signal generated by the digital gain set unit into an analog voltage, and an impedance element via which the current is fed to the transmission line and which is connected between the output of the converter and one of the two terminals of the transmission line.

8. An interface unit for providing impedance matching with the impedance $Z_{line}$ between two transmission line terminals and a transmitter/receiver unit connected thereto, and comprising:

a current generator for generating an AC current running into the transmission line;

a device for sensing the voltage across the two terminals of the transmission line; and a control device receiving a value of the sensed voltage and controlling the current generator in response thereto, so that the current provided by the current generator, together with the voltage across the two terminals of the transmission line, provide that, as seen from the transmission line, the interface unit has an output impedance compatible with the transmission line impedance $Z_{line}$; and wherein the voltage-sensing device for sensing the voltage across the two terminals of the transmission line is coupled to the same terminal as the impedance, and wherein an analog level of the voltage is converted via an analog-to-digital converter into a digital representation which is fed to a digital amplifier controlling the gain of a digital speech and/or data signal to be transmitted along the transmission line.

9. An interface unit according to claim 8, wherein the digital output signal from the digital amplifier is fed to a digital-to-analog converter which converts the digital speech and/or data signal into an analog signal, whose AC part contains the speech and/or data signal, said AC part constituting said AC current.

10. A method of providing impedance matching with the impedance $Z_{line}$, between two transmission line terminals and a transmitter/receiver unit connected thereto, wherein the transmitter/receiver unit has a current generator for generating an AC current which is fed to one of the two transmission line terminals, and comprising steps of:

sensing the voltage across the two terminals of the transmission line;

generating a digital signal in response to the sensed voltage by means of a digital gain set unit included in said current generator;

converting the digital signal generated by the digital gain set unit into an analog voltage by means of a digital-to-analog converter included in said current generator; and feeding the AC current to the transmission line via an impedance which is connected between the output of the converter and one of the two terminals of the transmission line, whereby the transmitter/receiver unit, seen from the transmission line, has an output impedance corresponding to the transmission line impedance $Z_{line}$.

11. An interface unit for providing impedance matching with the impedance $Z_{line}$ between two transmission line terminals and a transmitter/receiver unit connected thereto, and comprising:

a current generator for generating an AC current running into the transmission line;

a device for sensing the voltage across the two terminals of the transmission line;

a control device receiving a measure for the sensed voltage and controlling the current generator in response thereto so that said current generator supplies an AC current which together with the voltage across the two terminals of the transmission line provide that the interface unit, seen from the transmission line, has an output impedance compatible with the transmission line impedance $Z_{line}$;

said voltage-sensing device is coupled to the same terminal as the impedance; and an analog-to-digital converter for converting the analog voltage level into a digital representation which is fed to a digital amplifier controlling the gain of a digital speech and/or data signal to be transmitted along the transmission line.

12. An interface unit according to claim 11, wherein the digital output signal from the digital amplifier is fed to a digital-to-analog converter which converts the digital speech and/or data signal into an analog signal, whose AC part contains the speech and/or data signal, said AC part constituting said AC current.

* * * * *